(12) United States Patent
Krishnan et al.

(10) Patent No.: US 8,825,479 B2
(45) Date of Patent: *Sep. 2, 2014

(54) SYSTEM AND METHOD FOR RECOGNIZING EMOTIONAL STATE FROM A SPEECH SIGNAL

(71) Applicant: Simple Emotion, Inc., Portland, OR (US)

(72) Inventors: Akash Krishnan, Portland, OR (US); Matthew Fernandez, Portland, OR (US)

(73) Assignee: Simple Emotion, Inc., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/062,433

(22) Filed: Oct. 24, 2013

(65) Prior Publication Data

US 2014/0052448 A1 Feb. 20, 2014

Related U.S. Application Data

(63) Continuation of application No. 13/092,792, filed on Apr. 22, 2011, now Pat. No. 8,595,005.

(60) Provisional application No. 61/349,990, filed on May 31, 2010.

(51) Int. Cl.
*G10L 21/00* (2013.01)
*G10L 15/00* (2013.01)
*G10L 15/24* (2013.01)
*G10L 17/26* (2013.01)
*G10L 25/24* (2013.01)

(52) U.S. Cl.
CPC .................. *G10L 15/24* (2013.01); *G10L 17/26* (2013.01); *G10L 25/24* (2013.01)
USPC ............................ 704/236; 704/205; 704/211

(58) Field of Classification Search
CPC ................................ G10L 17/26; G10L 25/63
USPC .......................................... 704/236, 205, 211
See application file for complete search history.

(56) References Cited

U.S. PATENT DOCUMENTS

| 5,583,961 A | * | 12/1996 | Pawlewski et al. | 704/241 |
|---|---|---|---|---|
| 5,749,073 A | * | 5/1998 | Slaney | 704/278 |
| 6,173,260 B1 | * | 1/2001 | Slaney | 704/250 |
| 6,226,328 B1 | * | 5/2001 | Assuncao | 375/240.26 |

(Continued)

OTHER PUBLICATIONS

Kim, S., Georgiou, et al. Real-Time Emotion Detection System, Using Speech: Multi-modal Fusion of Different Timescale Features. Proceedings of the IEEE Multimedia Signal Processing Workshop (2007). 48-51.

(Continued)

*Primary Examiner* — Eric Yen
(74) *Attorney, Agent, or Firm* — Jeffrey Schox; Thomas Gwinn (57) ABSTRACT

A computerized method, software, and system for recognizing emotions from a speech signal, wherein statistical and MFCC features are extracted from the speech signal, the MFCC features are sorted to provide a basis for comparison between the speech signal and reference samples, the statistical and MFCC features are compared between the speech signal and reference samples, a scoring system is used to compare relative correlation to different emotions, a probable emotional state is assigned to the speech signal based on the scoring system and the probable emotional state is communicated to a user.

14 Claims, 11 Drawing Sheets

(56) References Cited

U.S. PATENT DOCUMENTS

| | | | |
|---|---|---|---|
| 6,529,866 B1* | 3/2003 | Cope et al. | 704/205 |
| 6,691,090 B1* | 2/2004 | Laurila et al. | 704/250 |
| 6,845,359 B2* | 1/2005 | Ramabadran | 704/266 |
| 7,027,979 B2* | 4/2006 | Ramabadran | 704/205 |
| 7,035,791 B2* | 4/2006 | Chazan et al. | 704/207 |
| 7,035,797 B2* | 4/2006 | Iso-Sipila | 704/227 |
| 7,058,570 B1* | 6/2006 | Yu et al. | 704/219 |
| 7,058,889 B2* | 6/2006 | Trovato et al. | 715/716 |
| 7,222,075 B2* | 5/2007 | Petrushin | 704/270 |
| 7,283,962 B2* | 10/2007 | Meyerhoff et al. | 704/270 |
| 7,340,393 B2 | 3/2008 | Mitsuyoshi | |
| 7,451,079 B2 | 11/2008 | Oudeyer | |
| 7,627,475 B2* | 12/2009 | Petrushin | 704/270 |
| 7,756,874 B2* | 7/2010 | Hoekman et al. | 707/737 |
| 8,180,638 B2* | 5/2012 | Kim et al. | 704/250 |
| 8,214,214 B2* | 7/2012 | Bennett | 704/254 |
| 8,412,526 B2* | 4/2013 | Sorin | 704/256 |
| 8,538,755 B2* | 9/2013 | Bollano et al. | 704/236 |
| 2002/0194002 A1* | 12/2002 | Petrushin | 704/270 |
| 2004/0143435 A1* | 7/2004 | Deng et al. | 704/256 |
| 2006/0143010 A1* | 6/2006 | Han et al. | 704/254 |
| 2007/0094009 A1* | 4/2007 | Ryu et al. | 704/200.1 |
| 2008/0249774 A1* | 10/2008 | Kim et al. | 704/250 |
| 2008/0288255 A1* | 11/2008 | Carin et al. | 704/256.1 |
| 2009/0208913 A1* | 8/2009 | Xu et al. | 434/169 |
| 2009/0313019 A1 | 12/2009 | Kato et al. | |
| 2010/0088088 A1 | 4/2010 | Bollano et al. | |
| 2010/0185446 A1* | 7/2010 | Homma et al. | 704/251 |
| 2012/0065961 A1* | 3/2012 | Latorre et al. | 704/9 |
| 2013/0024016 A1* | 1/2013 | Bhat | 700/94 |

OTHER PUBLICATIONS

Lee, C. M. et al., Classifying emotions in human-machine spoken dialogs. International Conference on Multimedia & Expo '02, (2002). 1, 737-740.

Nwe, T. et al., Speech emotion recognition using hidden Markov models. Elsevier Speech Communications Journal, (2003). 41(4), 603-623.

Petrushin, V., Emotion in Speech: Recognition and Application to Call Centers. Artificial Neural Networks in Engineering '99. (1999). 7-10.

Schuller, B., et al. The interspeech 2009 emotion challenge. Proceedings of Interspeech 2009, 1, 312-315.

\* cited by examiner

SYSTEM AND METHOD FOR RECOGNIZING EMOTIONAL STATE FROM A SPEECH SIGNAL

CROSS-REFERENCE TO RELATED APPLICATIONS

This application is a continuation of prior U.S. application Ser. No. 13/092,792, filed on 22 Apr. 2011, which claims the benefit of U.S. Provisional Application Ser. No. 61/349,990, filed 31 May 2010, both of which are incorporated in their entirety by this reference.

TECHNICAL FIELD

The present invention relates to a method and systems for processing a speech signal for the purpose of efficiently and accurately recognizing the emotional state of the utterer.

BACKGROUND

Current state-of-the-art emotion detectors only have an accuracy of around 40-50% at identifying the most dominate emotion from four to five different emotions. Thus, a problem for emotional speech processing is the limited functionality of speech recognition systems. Historically, the two most common algorithms in speech recognition systems are Dynamic Time Warping (DTW) and Hidden Markov Models (HMMs). DTW is an approach that was historically used for speech recognition but has now been largely displaced by the more successful HMM approach. HMMs are statistical models which output a sequence of symbols or quantities. They are popular in speech recognition because they can be trained automatically and are simple and computationally feasible to use. Modern speech recognition systems use various combinations of a number of standard techniques in order to improve results over the basic approach of HMMs, including utilizing Mel-Frequency Cepstral Coefficients (MFCCs).

A mel-frequency cepstrum (MFC) is a representation of the short-term power spectrum of sound, based on a linear cosine transform of a log power spectrum on a nonlinear mel scale of frequency. Mel-frequency cepstral coefficients (MFCCs) are coefficients that collectively make up an MFC. In the MFC, the frequency bands are equally spaced on the mel scale, which approximates the human auditory system's response more closely than the linearly-spaced frequency bands used in the normal cepstrum. This frequency warming can allow for better representation of sound, for example, in audio compression. Thus, MFCCs are commonly used features in speech recognition systems, such as systems which can automatically recognize numbers spoken into a telephone. Speech recognition algorithms, such as those that utilize MFCCs, can also help people suffering from social impairments, such as autism, recognize others' emotions.

People with autism often lack the intuition about others that many people take for granted. Autistic children are less likely to exhibit social understanding, approach others spontaneously, imitate and respond to emotions, and communicate nonverbally. Despite the common belief that children with autism prefer to be alone, children with high-functioning autism suffer from more intense and frequent loneliness compared to non-autistic peers. Making and maintaining friendships often proves to be difficult for those with autism. Therefore, improvements in speech audio processing, or more specifically, emotional speech processing could be a powerful tool to help autistic children identity others emotions. Autistic children's new found ability to communicate with others could improve their lives.

So as to reduce the complexity and length of the Detailed Specification, and to fully establish the state of the art in certain areas of technology, Applicant herein expressly incorporates by reference, in their entirety, all of the following materials identified in each numbered paragraph below.

U.S. Pat. No. 7,340,393 by Mitsuyoshi describes a method for speech-based emotion apparatuses capable of accurately detecting emotions of a human. The speech-based emotion apparatuses detect intensity, tempo, and intonation in the inputted voice based on parameters of change in the inputted voice signal, and video detects the change of expression on the subject's face. The emotion detecting method can be utilized for emotion detection in the medical field for a variety of systems as part of artificial intelligence and artificial sensibility. As well as utilization for a variety of systems used in many ways for controlling the sensibility of virtual humans and robots.

U.S. Pub. No. 2010/0088088 by Bollano et al describes a system and method for an automated emotional recognition system adapted to improve processing capability of artificial intelligence in a more flexible, portable and personalized manner by utilizing a method for an automated emotional recognition system to determine the emotional states of a speaker based on the analysis of a speech signal involving use of telecommunications terminals of scarce processing capability like telephones, mobile phones, PDAs, and similar devices.

U.S. Pat. No. 7,451,079 by Oudeyer describes an emotion apparatus and method which improves the accuracy and processing capability by using a low-pass tittering of the voice signal to extract at least one feature from a signal and processes the extracted feature to detect the emotion in a short utterance. It then generates an emotion-detecting algorithm using teaching algorithm, exploiting at least one feature extracted from a low-passed filtered voice signal.

U.S. Pub. No. 2009/0313019 by Kato et al also describes a speech-based emotion recognition apparatus which improves both accuracy and processing capability for recognizing a speaker's emotion by detecting a variation caused by tension or relaxation of a vocal organ, or an emotion, an expression or speaking style. The speech-based emotion recognition apparatus can detect an emotion in a small unit, a phoneme, and perform emotion recognition with high accuracy by using by using a relationship between characteristic tone, language, and regional differences and a speaker's emotion.

Kim, et al. discloses an attempt at building a real-time emotion detection system which utilizes multi-modal fusion of different timescale features of speech. "Conventional spectral and prosody features are used for intra-frame and supra-frame features respectively, and a new information fusion algorithm which takes care of the characteristics of each machine learning algorithm is introduced. In this framework, the proposed system can be associated with additional features, such as lexical or discourse information, in later steps. To verify the real-time system performance, binary decision tasks on angry and neutral emotion are performed using concatenated speech signal simulating real-time conditions." (Kim, S., Georgiou, P., Lee, S., & Narayanan, S. (2007). Real-Time Emotion Detection System, Using Speech: Multimodal Fusion of Different Timescale Features. Proceedings of the IEEE Multimedia, Signal Processing Workshop, 48-51).

Kwon, et al. discloses selecting pitch, log energy, formant, mel-band energies, and mel frequency cepstral coefficients (MFCCs) as the base features, and added velocity/ acceleration of pitch and MFCCs to form feature streams. "We extracted statistics used for discriminative classifiers, assuming that each stream is a one-dimensional signal. Extracted features were analyzed by using quadratic discriminant analysis (QDA) and support vector machine (SVM). Experimental results showed that pitch and energy were the most important factors. Using two different kinds of databases, we compared emotion recognition performance of various classifiers: SVM, linear discriminant analysis (LDA), QDA and hidden Markov model (HMM). With the text-independent SUSAS database, we achieved the best accuracy of 96.3% for stressed/neutral style classification and 70.1% for 4-class speaking style classification using Gaussian SVM, which is superior to the previous results. With the speaker-independent AIBO database, we achieved 42.3% accuracy for 5-class emotion recognition." (K won, O. W., Chan, K., Hao, J., & Lee, T. W. (2003). Emotion Recognition by Speech signals. Eurospeech '03, 125-128).

Lee, et al. discloses a report on "the comparison between various acoustic feature sets and classification algorithms for classifying spoken utterances based on the emotional state of the speaker, [using] three different techniques—linear discriminant classifier (LDC), k-nearest neighborhood (k-NN) classifier, and support vector machine classifier (SVO) for classifying utterances into 2 emotion classes: negative and non-negative." (Lee, C M., Narayanan, S., & Pieraccini, R. (2002). Classifying emotions in human-machine spoken dialogs. International Conference on Multimedia & Expo '02, 737-740).

Nwe, et al. discloses a text independent method of emotion classification of speech. The disclosed method "makes use of short time log frequency power coefficients (LFPC) to represent the speech signals and a discrete hidden Markov model (HMM) as the classifier." (Nwe, T., Foo, S., & Silva, L. D. (2003}. Speech emotion recognition using hidden Markov models. Elsevier Speech Communications Journal, 41(4), 603-623).

Petrushin discloses "two experimental studies on vocal emotion expression and recognition. The first study deals with a corpus of 700 short utterances expressing five emotions: happiness, anger, sadness, fear, and normal (unemotional) state, which were portrayed by thirty non-professional actors. The second study uses a corpus of 56 telephone messages of varying length (from 15 to 90 seconds) expressing mostly nomial and angry emotions that were recorded by eighteen non-professional actors." (Petrushin, V. (1999). Emotion in Speech: Recognition and Application to Call Centers. Artificial Neural Networks in Engineering '99, 7-10), Picard provides a thoughtful and thorough discussion on giving computers "affective abilities," or the ability to process emotions. (Picard, R. W. (1997). Affective computing. Cambridge, Mass.: MIT Press).

Schuller, et al. discloses the challenge, the corpus, the features, and benchmark results of two popular approaches towards emotion recognition fhm1 speech: dynamic modeling flow level descriptors by hidden Markov models and static modeling using supra-segmental information on the chunk level. (Schuller, B., Steidl, S., & Batliner, A. (2009). The interspeech 2009 emotion challenge. Proceedings of Interspeech 2009, 1, 312-315).

While general emotion recognition concepts are known, based on above disclosures, there are still issues with emotional speech processing's poor accuracy of detecting the correct emotion and insufficient processing capability. Poor accuracy and insufficient processing capability are grave problems because they make a potentially life-altering technology, emotional speech processing, unreliable and functionally impractical. Therefore, improvements to both the accuracy and processing capability of emotional speech processing are needed to make the technology more reliable and practical.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

The present invention provides, among other things, a system and method for recognizing emotional state from a speech signal. It provides, among other things, a computerized method for recognizing one or more emotions from a primary audio signal. This computerized method includes: using a computer to extract at least two features from the primary audio signal, wherein at least one of those features is a Mel-Frequency Cepstral Coefficient (MFCC), and at least one those features is a statistical feature; using a computer to perform a first comparison of the statistical feature(s) to a first reference sample; using a computer to assign at least one first emotional state score to the primary audio signal based on the first comparison; using a computer to divide the MFCC feature(s) into at least two points; using a computer to sort those points; using a computer to perform a second comparison of sorted points to a second reference sample; using a computer to assign at least one second emotional state score to the primary audio signal based on the second comparison; and using a computer to evaluate first emotional state score(s) and the second emotional state score(s) to assign at least one probable emotional state to the primary audio signal.

Additionally, the present invention provides a method as described above, further including, but not limited to, using a computer to create a reference database based on at least one reference audio signal, wherein the first and second reference samples are based on the reference database. It further provides selecting the reference audio signal(s) in a manner that optimizes the accuracy of the most-probable emotional state, or in a manner that optimizes a scope of efficacy of the computerized method.

Additionally, the present invention provides using a computer to further analyze the reference samples in order to differentiate two or more aspects based at least partly on the ability of the two or more aspects to differentiate emotional state.

The present invention also provides, among other things, a system, wherein the system includes a non-transitory, computer readable medium for recognizing one or more emotions from a primary audio signal, the computer readable medium having program code stored therein that when executed is configured to: use a computer to extract at least two features from the primary audio signal, wherein at least one of those features is a Mel-Frequency Cepstral Coefficient (MFCC), and at least one those features is a statistical feature; using a computer to perform a first comparison of the statistical feature(s) to a first reference sample; using a computer to assign at least one first emotional state score to the primary audio signal based on the first comparison: using a computer to divide the MFCC feature(s) into at least two points; using a computer to sort those points; using a computer to perform a second comparison of sorted points to a second reference sample; using a computer to assign at least one second emotional state score to the primary audio signal based on the second comparison; and using a computer to evaluate first emotional state score(s) and the second emotional state score (s) to assign at least one probable emotional state to the primary audio signal.

Additionally, the present invention provides a system as described above, further including, but not limited to, non-transitory, computer readable medium for recognizing one or more emotions from a primary audio signal, the computer readable medium having program code stored therein that when executed is configured to use a computer to create a reference database based on at least one reference audio signal, wherein the first and second reference samples are based on the reference database. It further provides using a computer selecting the reference audio signal(s) in a manner that optimizes the accuracy of the most-probable emotional state, or in a manner that optimizes a scope of efficacy of the computerized method.

Additionally, the present invention provides a system as described above, further including, but not limited to, non-transitory, computer readable medium for recognizing one or more emotions from a primary audio signal, the computer readable medium having program code stored therein that when executed is configured to analyze the reference samples in order to differentiate two or more aspects based at least partly on the ability of the two or more aspects to differentiate emotional state.

The present invention also provides a computerized system for recognizing one or more emotions from a primary audio signal, including, but not limited to: a database configured to store reference information against which to compare the primary audio signal; an input module configured to acquire the primary audio signal from sound waves with a microphone or from an audio file; an extraction module configured to extract at least one statistical feature and at least one MFCC feature from the primary audio signal; a classification engine module configured to assign at least one probable emotional state to the primary audio signal, wherein the classification engine module utilizes: a first comparison based on at least one statistical feature; and a second comparison based on the MFCC feature(s), wherein the MFCC feature(s) is/are divided and sorted prior to the second comparison; and an output module configured to communicate the probable emotional state(s) to a user interface.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 7:
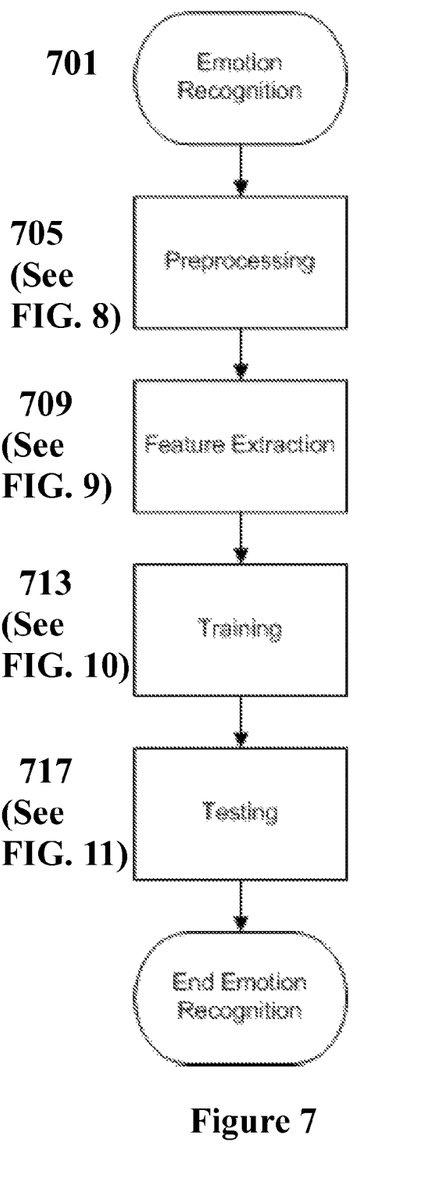
FIGS. 7-14 depict a method for recognizing emotional state from a speech signal.
Figure 8:
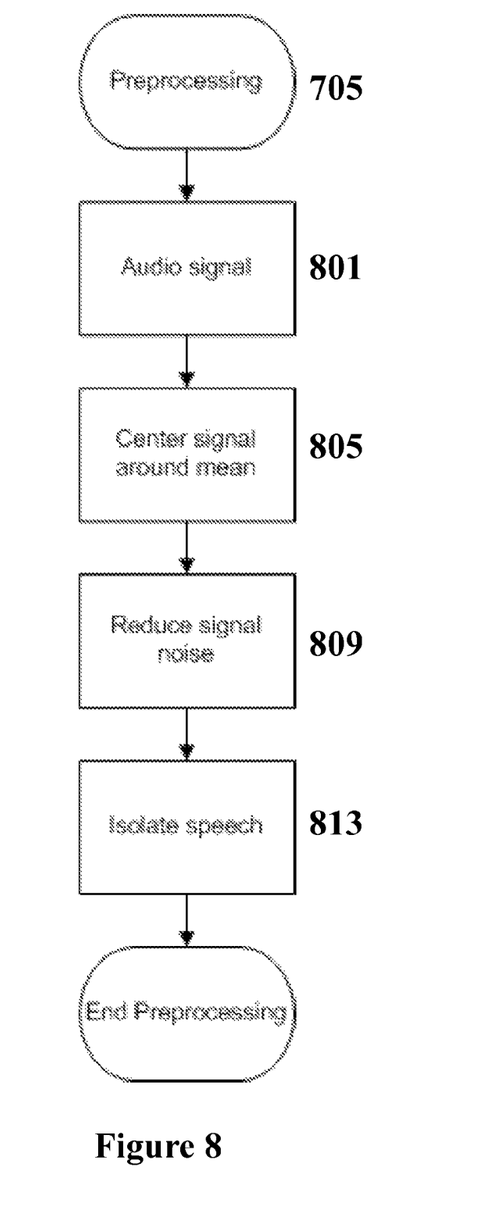
Figure 9:
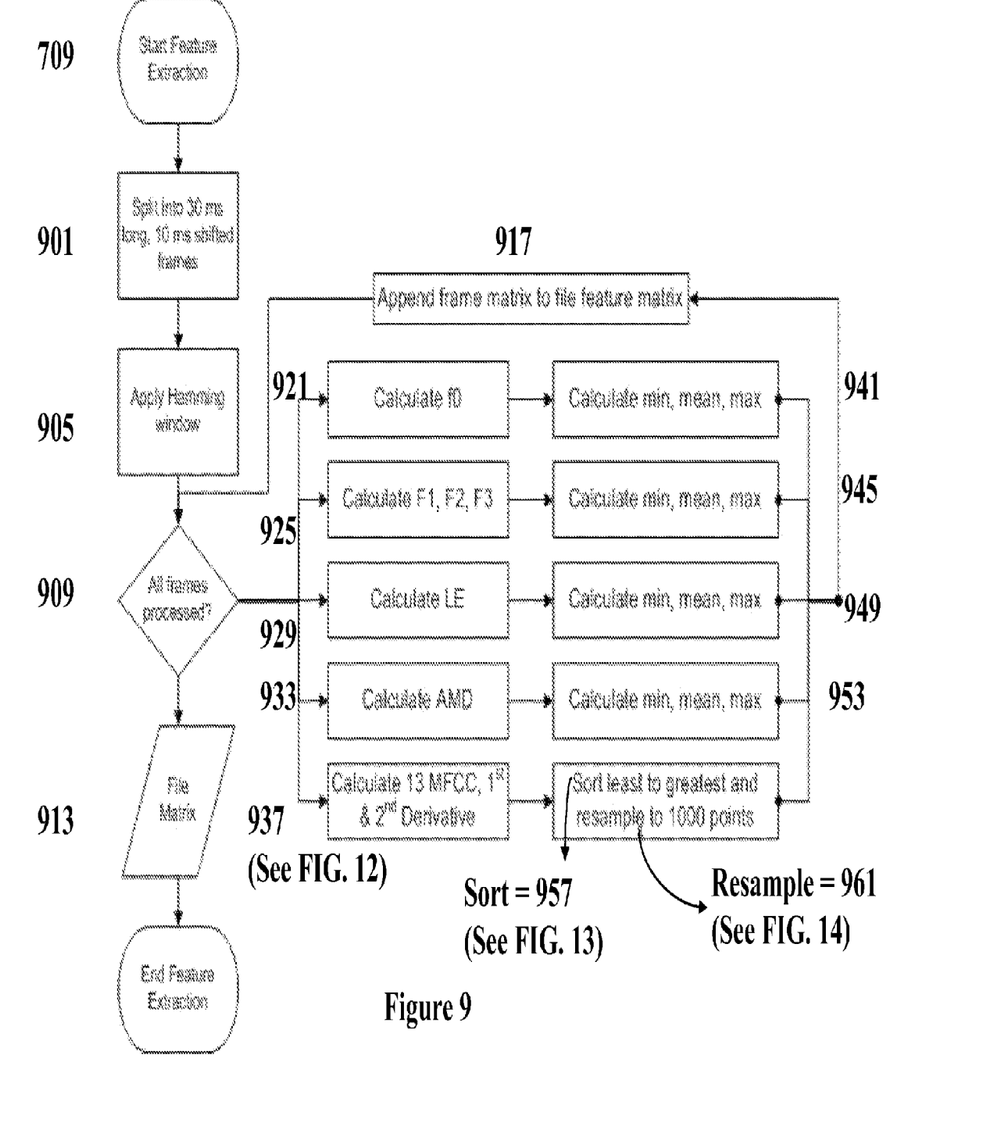
Figure 10:
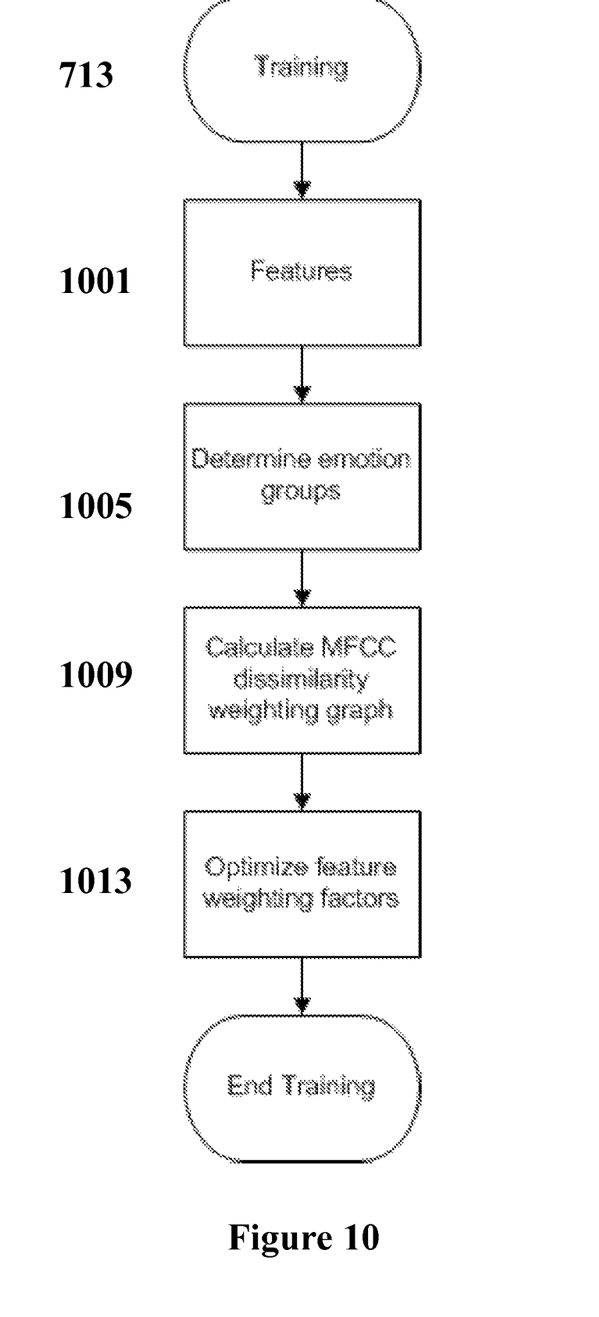
Figure 11:
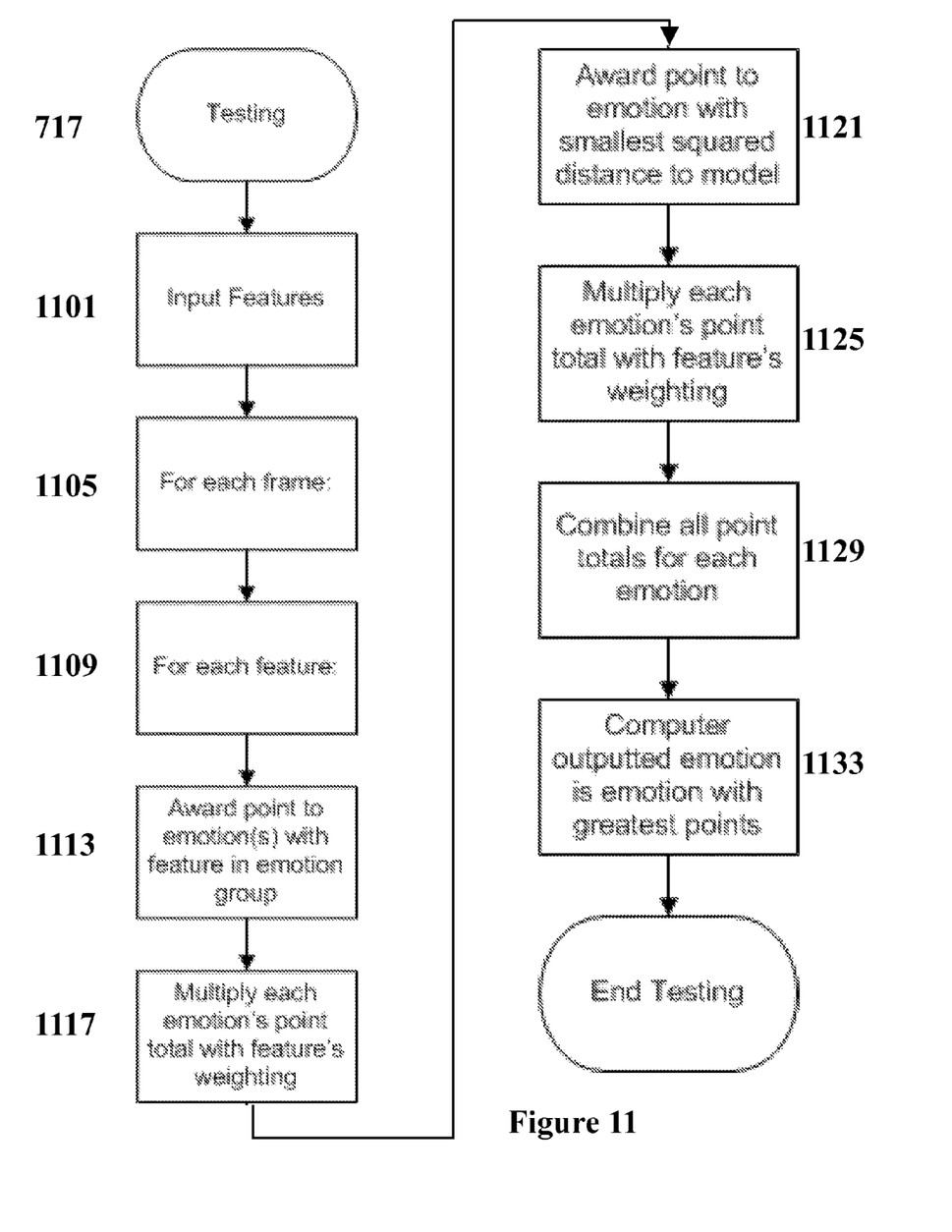
Figure 12:
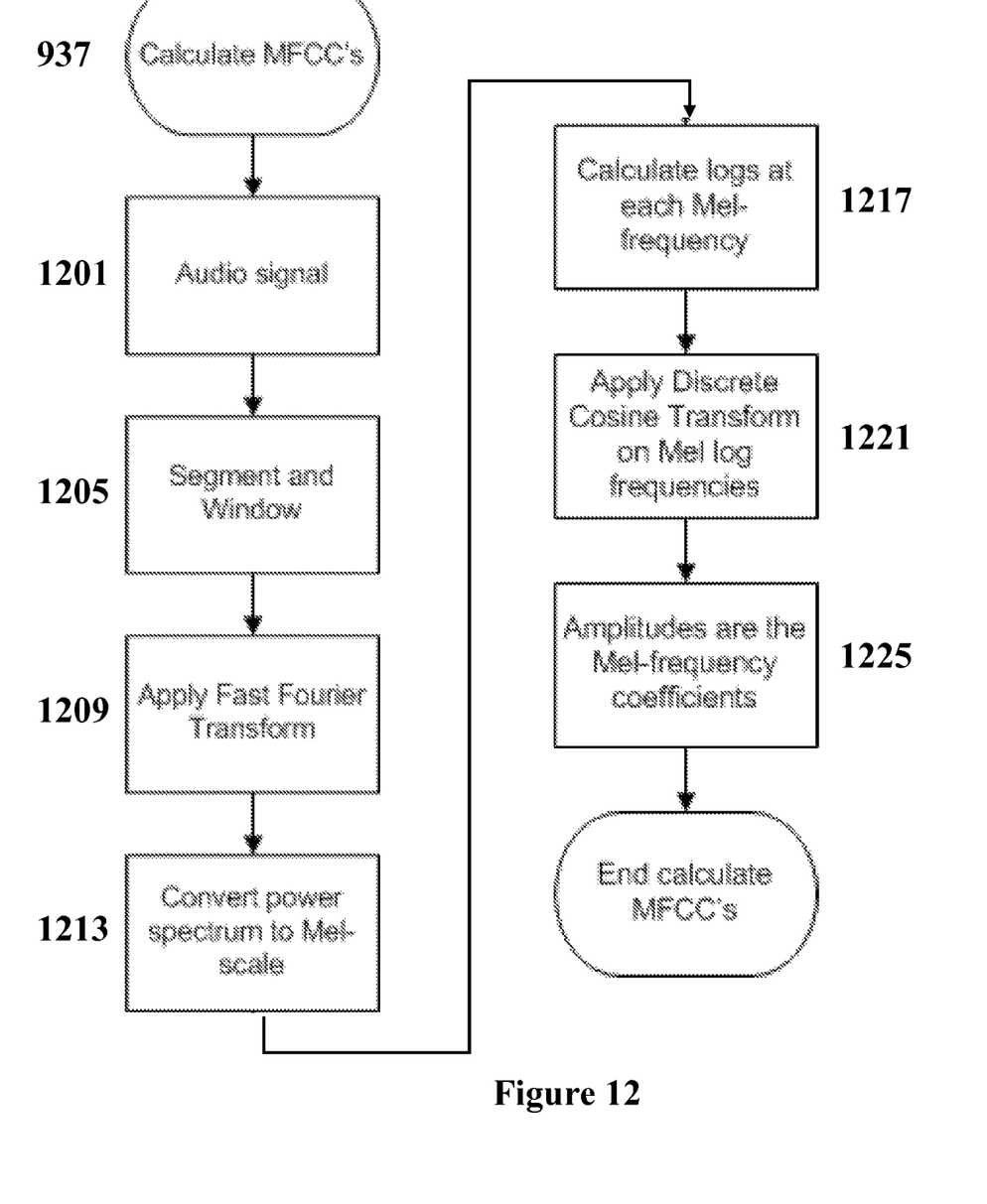
Figures 13, 14:
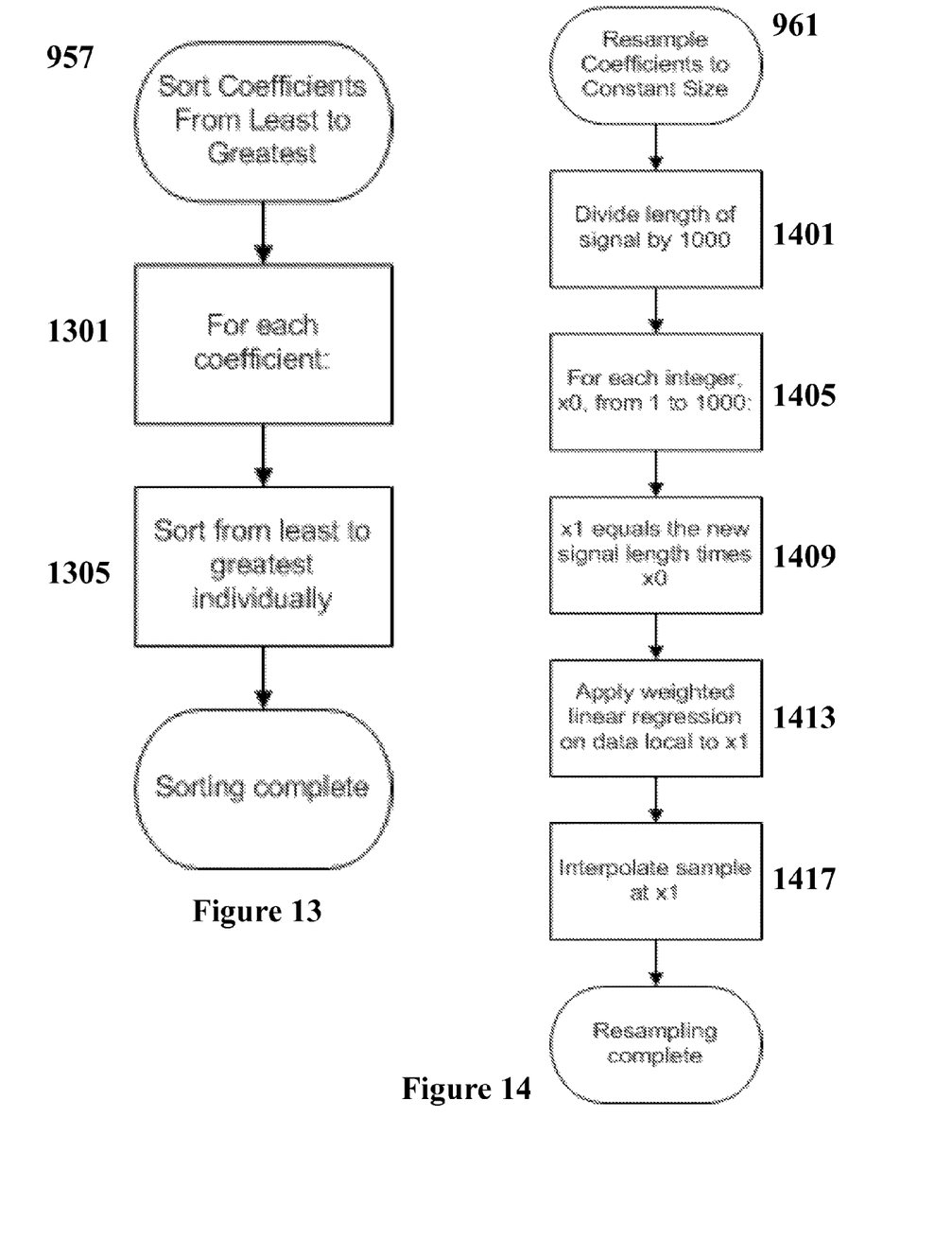

One embodiment of the invention is illustrated in FIG. 7. This embodiment is described in connection with a computer software program, together with relevant hardware, configured to execute the operations of the method. The "primary" audio signal is introduced to the system. Examples of introducing a primary audio signal into the system include, but are not limited to, recording a speech signal in real-time, for example, with a microphone, or utilizing a prerecorded signal that has been stored in a file with a format suitable for storing audio data. For the purposes of using a real-time recording, it is does not matter whether the real-time recording is permanently recorded beyond the period necessary for subsequent extracting.

In some embodiments, the primary audio signal is filtered some time after being introduced into the system. For example, this filtering may occur immediately after the primary audio signal is introduced into the system. The filter attenuates wave signals with a frequency above a specified frequency (low pass filtering), below a specified frequency (high pass filtering) or both (band pass filtering).

In some embodiments, a dynamic filter is used. Such a dynamic filter may depend on parameters such as the fundamental frequency. For example, a dynamic filter may attenuate waves with a frequency that is at least five times greater than the fundamental frequency that dominates the same time frame. In such a dynamic filter, there may be a preconfigured minimum and/or maximum frequency cutoff. For example, such a dynamic filter may attenuate waves based on some attribute such as fundamental frequency, but, regardless of that attribute, waves with frequencies over 2,000 Hz will always be attenuated while waves with frequencies under 450 Hz will never be attenuated. A person of ordinary skill in the art would know that these parameters may be altered in a way that captures a range of most useful frequencies for the application such that the greatest amount of useful data remains while the greatest amount of superfluous or interfering data is attenuated. Furthermore, a person of reasonable skill in the art would know that there are other ways to filter an audio signal.

In some embodiments, the primary audio signal is processed by the computer software program such that periods of silence are removed from the signal.

In some embodiments, the primary audio signal is processed by the computer software program such that features are extracted from the primary audio signal. Feature extraction is generally known in the art For example, open-source feature extraction software such as OpenSMILE (by Florian Eyben, Martin Wollmer, and Bjorn Schuller) may be used.

In some embodiments, the extracted features are analyzed in order to increase the emotion recognition accuracy. In some embodiments, statistical features are analyzed differently than MFCC features.

Figure 1:
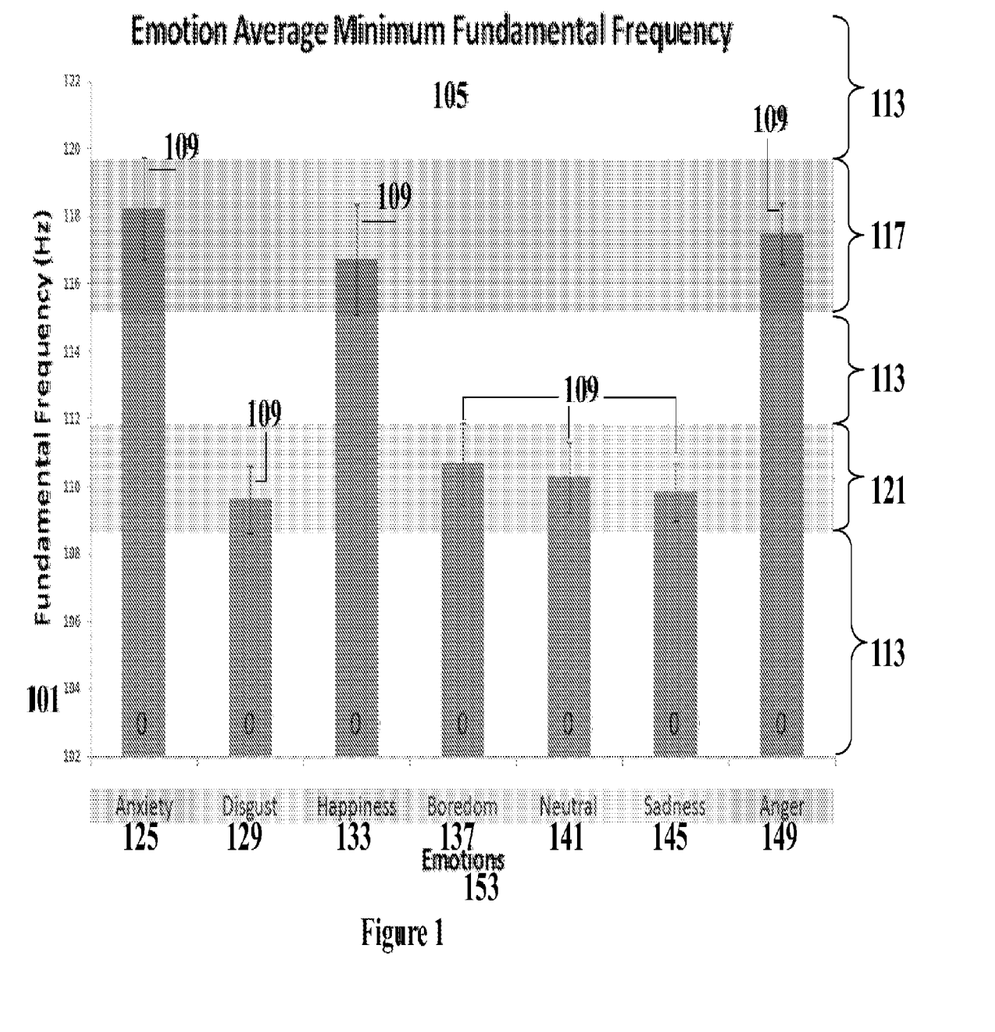
FIG. 1 depicts a representation of one way to perform a comparison of a statistical feature, wherein the statistical feature is average minimum fundamental frequency.

The following is a non-limiting example, depicted in FIG. 1, of one way to analyze the statistical features. For a given statistical feature 101, such as average minimum fundamental frequency, a reference database, or a reference sample which may be derived from a reference database, provides information 105 specific to the statistical feature's ability to distinguish between different emotions. For example, the reference database may be evaluated to provide calculated confidence intervals 109 corresponding to each of several emotions. As shown in FIG. 1, ranges 113, 117, and 121 may be defined which encompass zero 113, one, or multiple 117 and 121 emotions. In this example, a range 117 approximately between an average minimum fundamental frequency 101 of 115 and 120 Hz encompasses the emotions of anxiety 125, happiness 133, and anger 149. In this example, a range 121 approximately between an average minimum fundamental frequency 101 of 109 and 112 Hz encompasses the emotions of disgust 129, boredom 137, neutral 141, and sadness 145. In this example, a range 113 outside of the two aforementioned ranges does not encompass any emotion from this set of emotions 153.

In this example of analyzing the statistical feature, the statistical feature that has been extracted from the primary audio signal is divided into one or more time-frames. Alternatively, the primary audio signal can be similarly divided before or after any filtering or extraction step. An example of time-frame division involves dividing the time into several thirty-millisecond frames with each frame overlapping the previous frame by ten-milliseconds. A person of ordinary skill in the art would know that these values may be altered based on a particular application. Examples of reasons for altering these values include optimizing processing speed and optimizing emotion recognition accuracy.

In some embodiments that utilize a statistical feature analysis, a first set of comparisons is performed which compares the statistical feature of the primary audio signal to a first reference sample or reference database. In such a first set of comparisons, a comparison may be performed, for example, on each or any subset of a plurality of frames comprising the primary audio sample, or on the complete primary audio sample.

In some embodiments, at least one comparison in the first set comparisons results in assigning one or more scores to the primary audio signal. The following is provided as a non-limiting example of such a score assignment: If (a) the statistical feature being analyzed has an average minimum fundamental frequency 101 and (b) a reference sample evaluation provides a set of confidence intervals 109 like those shown in FIG. 1 and (c) a given frame of the primary audio signal, such as a thirty millisecond frame, has an average minimum fundamental frequency 101 of 117 Hz, then that frame will ascribe to the primary audio signal one (1) "vote" for anxiety 125, one (1) for happiness 133, and one (1) for anger 149, since it falls within the range 117 corresponding to those emotions, while the other emotions 129, 137, 141, and 145 would receive no votes. If, under the same conditions, the frame has an average minimum fundamental frequency of 113 Hz, then no emotions 153 would receive votes for that unit, since it falls within the range 113 corresponding to no emotions 153.

In some such embodiments, votes for each emotion 153 are summed over all of the units to provide a single first score set comprising a score for each of a set of emotions.

A person of ordinary skill in the art would know that other scoring systems may be utilized that would provide a metric with which to analyze and compare a statistical feature in the primary audio signal and reference sample, with the goal of providing at least a partial basis for recognizing emotion conveyed in the primary audio signal.

In some embodiments that utilize an MFCC feature analysis, a second set of comparisons is performed which compares the statistical feature of the primary audio signal to a second reference sample or reference database. In such a second set of comparisons, a comparison may be performed, for example, on each or any subset of a plurality of frames comprising the primary audio sample, or on the complete primary audio sample.

MFCC features can be expressed as a function that returns, as a non-limiting example 13 coefficients/features for a given input frame/subdivision of a speech signal, where a subdivision can be any region within the speech signal. In this example, if there are n subdivisions, there will be n instances of the set of 13 features (i.e. one set of 13 features per subdivision). Following this example, for each coefficient/feature, the n instances are used to calculate n instances of corresponding derivatives. This process may be done again for the second derivative using the n instances of the first derivative, and so on. The derivative calculation process may be done for each of the 13 coefficients, and thus, there would be n instances of 39 MFCC coefficients/features for the speech signal.

Figure 2:
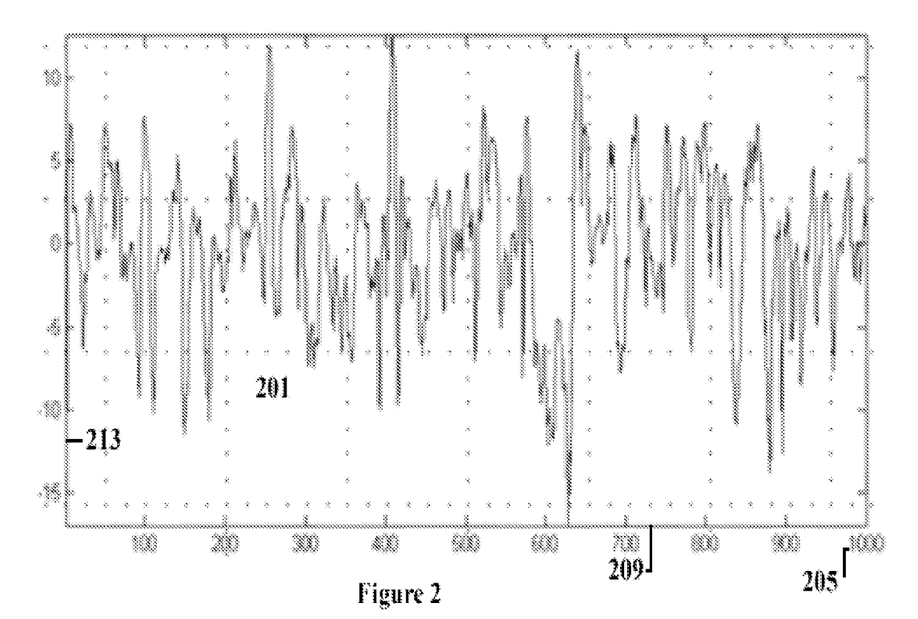
FIG. 2 depicts a plot of an MFCC feature of a primary audio signal that has been divided into 1,000 points. Because of the point density, the points may appear as lines. "Points" should not be confused with the gridlines depicted.

In some embodiments, at least one comparison in the second set of comparisons results in assigning one or more scores to the primary audio signal. The following is provided as a non-limiting example of such a score assignment:

As illustrated in FIG. 2, the MFCC feature 201, having been extracted from the primary audio signal, is divided into n subsections 205, where n may be equal to one thousand. A person of ordinary skill in the art would know that this number is very flexible depending on the application. In this example, a fixed number of subsections 205 is used rather than a fixed section length (i.e. thirty milliseconds) so that a primary audio signal and the reference sample or database to which the primary audio signal is compared will have the same number of subsections, regardless of their relative duration. However, it would be obvious to a person of ordinary skill in the art to use a fixed subsection length and use an algorithm to provide correspondence between the primary audio signal and the reference sample (e.g. resampling the n instances into m instances, where m may be defined manually once and used for analyzing all primary speech signals and references samples).

In this example, after the MFCC feature 201 is divided into subsections 205, a mathematical algorithm is used to turn each subsection into a point with an x-209 and y-213 axis component (as graphically depicted in FIG. 2, except that in this figure, it is important to note, the 1,000 points may appear linear because of the high point density). In some embodiments, this is done by using the average of the feature within the subsection, where the x-axis 209 represents the number of points (i.e. subsections) and the y-axis 213 represents the Mel Frequency (Mels). In some embodiments, the Mel Frequency of each point is normalized such that the maximum is +1 and the minimum is −1. This normalization may be done to allow for utilization of a simpler processing algorithm, where such algorithms would be obvious to a person of ordinary skill in the art.

Figure 3:
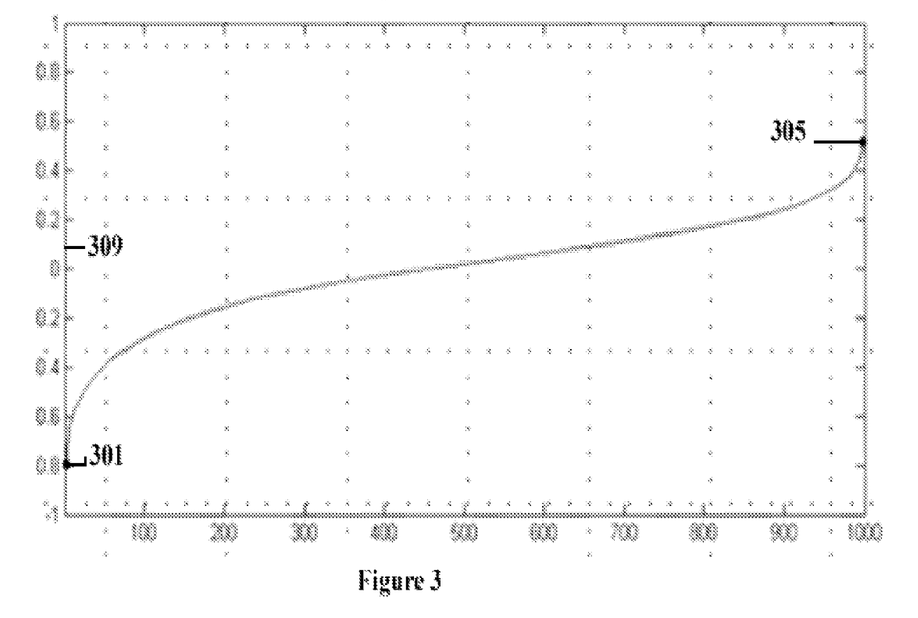
FIG. 3 depicts a plot of an MFCC feature of a primary audio signal that has been divided into 1,000 points, as in FIG. 2, except that the points have been resorted from left to right (on the x-axis) from smallest to largest (y-component). Because of the point density, the points may appear as lines. "Points" should not be confused with the gridlines depicted.

In some embodiments, as shown in FIG. 3, each point representing an average of the feature within the point's respective subsection is sorted. Each point is sorted such that the point with the lowest 301 Mel Frequency 213 (or normalized Mel Frequency 309) is set to one end of an x-axis, and the point with the highest 305 Mel Frequency is set to the opposite end of the x-axis. Each point between those two points would be thus sorted according to its relative Mel Frequency. One example of sorting would provide a representation in which the y-component increases as the x-component increases, as depicted in FIG. 3. However, other sorting methods are expected to be substantially as effective, such as the reverse, whereby the y-component decreases as the x-component increases.

Returning to the example that provides n instances of 39M FCC coefficients/features, each of the n instances may be sorted and/or rearranged, and the sorting and/or rearranging may be performed independently of the other coefficients. These n instances may be resampled to a greater, equal, or lesser, constant amount, m (such as m=1000), where m may be defined manually once and used for analyzing all primary speech signals and references samples. As an alternative example, n may be defined manually once and used for analyzing all primary speech signals and references samples.

Figure 4:
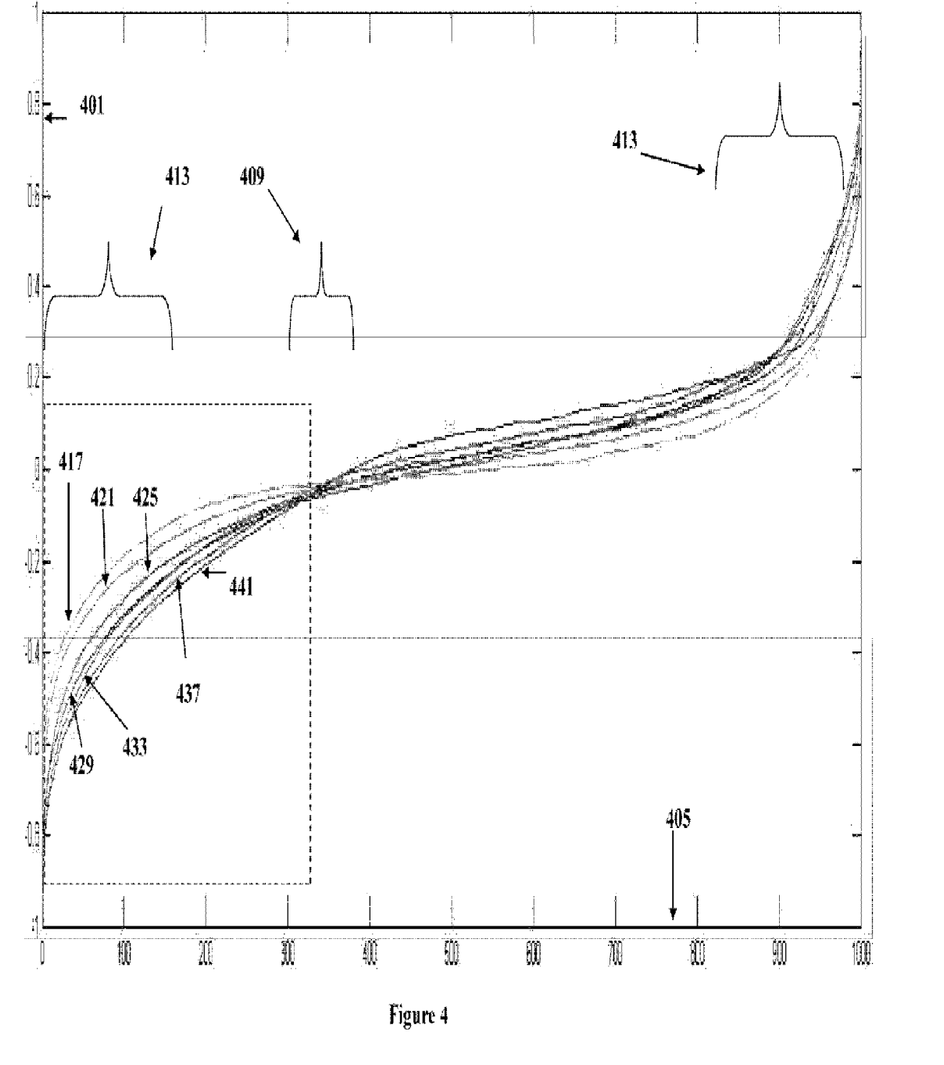
FIG. 4 depicts seven superimposed plots, which are each similar to the plot of FIG. 3, except that the y-component has been normalized between −1 and 1, and the seven plots depicted represent reference samples for each of seven different emotions.
Figure 5:
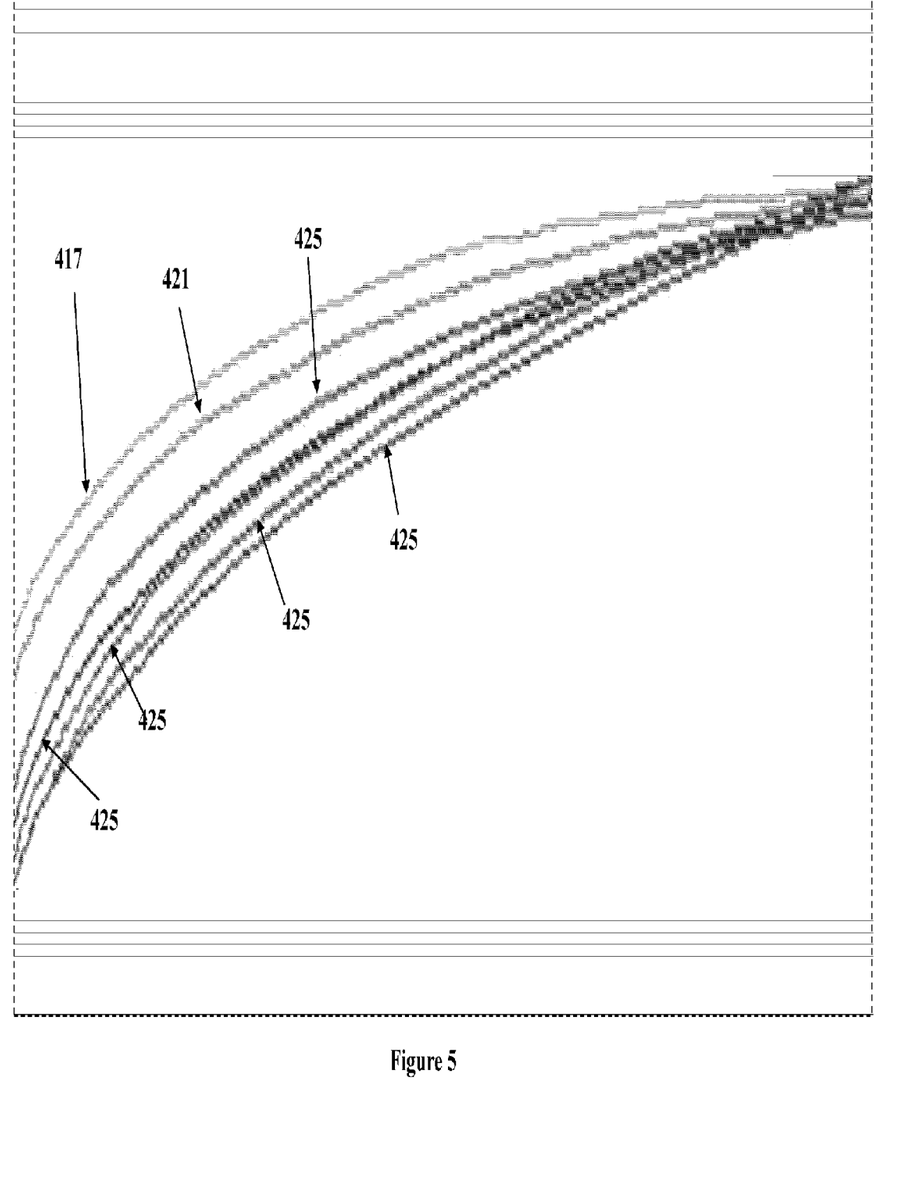
FIG. 5 depicts an enlarged version of the dotted box found in FIG. 4.

In some embodiments, the reference samples are processed in a similar manner as the primary audio sample, for example, by subdividing the MFCC feature, creating points from the averages, normalizing the points, and sorting the points as described in reference to the primary audio sample. This is illustrated in FIGS. 4 and 5, wherein seven references samples, corresponding to the emotions of sadness 417, boredom 421, neutral 425, disgust 429, anxiety 433, happiness 437, and anger 441, are processed. In some embodiments, this is done such that a one-to-one comparison, may be made between the processed, sorted MFCC feature of the primary audio sample (as depicted in FIG. 3) and that of the each reference samples (as depicted in FIG. 4). In these embodiments, such a comparison is made between corresponding points. For example, if each sample has one thousand points which have been reordered as described above, then the first point of the primary audio signal is compared with the first point of the reference sample, the second with the second, and so on. This comparison measures a difference between the primary audio sample and at least one reference sample at each point. In some embodiments, this comparison measures a difference between the primary audio sample and each of the reference samples at each point, then calculates which difference is smallest (i.e. which reference sample is most closely approximated by the primary audio sample at each point).

In some embodiments, a reference database provides at least one reference sample for each of a set of emotions. In such an embodiment, each emotion-reference sample is processed as described above, for example, by subdividing the MFCC feature, creating points from the averages, normalizing the points, and sorting the points. In such embodiments, when a point of the primary audio signal is compared to each of the emotion-reference samples, the emotion reference sample 417, 421, 425, 429, 433, 437 and 441 that the primary audio signal most closely approximates is selected for the purpose of scoring or voting. A person of ordinary skill in the art would know that it would not be necessary to compare a point from the primary audio signal to each of the emotion reference samples 417, 421, 425, 429, 433, 437 and 441, for example, if the emotion reference sample points are used to define a set of ranges and the primary audio sample point is only compared to the two emotion-reference samples that define the range in which it falls (i.e. to determine which emotion-reference sample is most closely approximated).

In such embodiments, for the purposes of scoring in the second comparison, a vote is assigned to the primary audio signal for each point compared to the reference samples 417, 421, 425, 429, 433, 437 and 441, wherein the vote refers to an emotion. The emotion assigned to each such vote may be the emotion corresponding to the most closely approximated emotion reference sample 417, 421, 425, 429, 433, 437 and 441.

Figure 6:
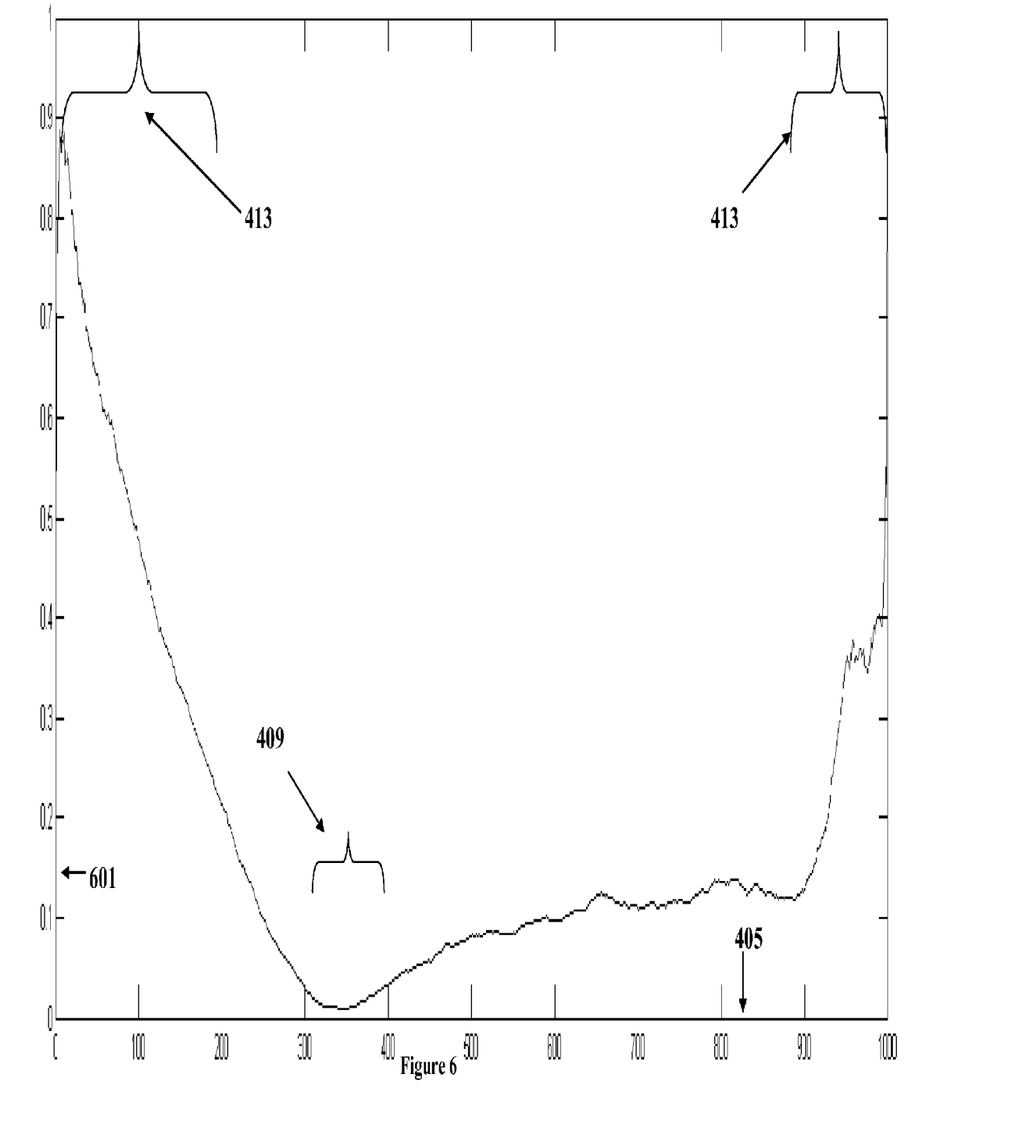
FIG. 6 depicts a variance weighting plot based upon the variance between the seven superimposed plots of FIG. 4.

In some embodiments, as illustrated in FIGS. 4 and 6, a weighting system is utilized to improve the efficacy of the second comparison (here, FIG. 6 is a graphical representation of the variance between the emotion reference samples 417, 421, 425, 429, 433, 437 and 441 of FIG. 4; thus, a high variance on FIG. 4 will correspond to a high variance weight 601, or y-axis value, for the corresponding point index 405 on FIG. 6). Such a weighting system may, for example, involve weighting a vote based on its relevance, such as, for example, the ability of the point, from which the vote originated, to distinguish emotion. For example, referring to FIGS. 4 and 6, the points 413 near the range of corresponding point index 405 0 to 200 and 900 to 1000 demonstrate relatively high levels of variance 601 between the different emotion-reference samples 417, 421, 425, 429, 433, 437 and 441. On the other hand, the points 409 near the range of corresponding point index 405 300 to 400 show close to zero variance 601. Therefore, referring to the test sample, finding that a point in the higher ranges 413 most closely approximates a particular emotion is much more meaningful than finding that a point in the lower range 409 most closely approximates a particular emotion. That is because all of the emotion reference samples 417, 421, 425, 429, 433, 437 and 441 are very close in the lower range 409, whereas they are more distinguishable in the higher ranges 413. Thus, for example, the vote for the point with a corresponding point index 405 of 50 (in the higher range 413) will be weighted more heavily than the vote for the point with a corresponding point index 405 of 350 (in the lower range 409). This weighting scheme is visualized in FIG. 6, which is calculated from the variance between the emotion reference samples. A person of ordinary skill in the art would be aware that there are several ways to make such a meaningful variance calculation. A non-limiting example is one in which the variance is equal to the mean of the square minus the square of the mean. The range of variances may be normalized into variance weights 601 between 0 and 1 as shown in FIG. 6. In some embodiments, the corresponding variance weight 601 for each point may be used in the calculation (multiplicatively, for example) of the vote corresponding to that respective point.

In some embodiments, votes (weighted or otherwise) for each emotion are summed over all of the points to provide a single second score set comprising a score for each of a set of emotions.

A person of ordinary skill in the art would know that other scoring systems may be utilized that would provide a metric with which to analyze and compare a statistical feature in the primary audio signal and reference sample, with the goal of providing at least a partial basis for recognizing emotion conveyed in the primary audio signal.

In some embodiments, the first and second score sets are evaluated to develop a set of overall scores, which is used to determine the most probable emotional state. For example, if the evaluation of first and second scores indicates that the emotion of happy has an overall score that is higher than all other emotions, then the most probable emotional state would be happy.

In some embodiments, the first and second scores are simply summed to develop the overall score for each emotion. In some embodiments, the first and second scores are weighted.

In some embodiments, the most probable emotional state is communicated to a user, for example, through a graphical interface. An example of a graphical interface is a display (such as on a phone, computer, wristwatch, or some other such device) which shows, by words or other symbols (such as a face expressing a particular emotion, a sound, or any other symbol that would utilize one or more of the user's senses in communication thereof) the most probable emotional state.

In some embodiments, emotional states with an overall score that is less than that of the most probable emotional state may also be communicated to a user. For example, a second-most probable emotional state could be communicated to a user. In some embodiments, one or more hybrid emotions, which are combinations of emotions, such as angry-anxious, may be communicated to a user when there are, for example, multiple dominant emotions.

In some embodiments, an indication of certainty is also communicated to a user. For example, if the most probable emotional state's overall score surpasses those of other emotional states by only a small margin, then there would be an indication of low certainty. However, if such a margin is relatively large, then there would be an indication of high certainty.

In some embodiments, a user can provide feedback regarding the actual emotional state. Such feedback is used in order to evaluate the performance of the system in accurately recognizing emotional state. In some embodiments, such feedback is used as a basis for fine-tuning parameters of the system in a manner that improves accuracy.

In some embodiments, the system is trained using reference samples. This training step provides a reference database, 'which is used as a source with which to compare a primary audio signal. For example, a sample audio signal that clearly exemplifies sadness could be used as a reference sample for sadness. In this example, individual reference samples would jointly comprise the reference database. In some embodiments, multiple reference samples are used for each emotion.

In some embodiments, the source of the reference samples used for training is specifically selected in a way that optimizes system accuracy. For example, in an application that will be tailored to a specific user (i.e. the primary audio signal will always come from the same person), then the source of the reference samples would be that person to which it is tailored. This would be done because there are peculiarities in speech patterns that vary between individuals. Training a system using reference samples from the same person whose speech will later be evaluated by the system is one way to control for these peculiarities.

In some embodiments, the source of the reference samples used for training is specifically selected in a way that optimizes the scope of efficacy for the system. For example, where regional, cultural, racial, or other factors affect emotion-specific speech patterns across a broad population, reference samples may be chosen from a source or sources that provide an adequate representation of emotion-specific speech patterns for that population. Therefore, if the embodiment is intended to be used to recognize emotions in individuals coming from a broad population (e.g. worldwide and language-independent), the source of the reference samples would be selected to provide the best overall results within that broad scope. However, if the embodiment is intended to be used in a smaller scope (e.g. region, age, and/or language specific), then the source of the reference samples would be selected to provide the best overall results within that limited scope. This optimization is considered because it is expected that a narrower scope will tend to provide more accurate results.

An alternative embodiment preferably implements the above methods in a computer-readable medium storing computer-readable instructions. The instructions are preferably executed by computer-executable components preferably integrated with a network security system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for recognizing emotion in a primary audio signal comprising:
    extracting, using a computer, an MFCC feature from the primary audio signal;
    dividing, using a computer, the MFCC feature into MFCC subsections;
    selecting, using a computer, a set of the MFCC subsections;
    sorting, using a computer, the set of MFCC subsections into a sorted set of MFCC subsections;
    selecting, using a computer, a first set of reference samples from a reference database;
    computing, using a computer, a first emotional state score from a comparison of the sorted set of MFCC subsections and the first set of reference samples; and,
    determining, using a computer, a probable emotional state for the primary audio signal from the first emotional state score.

2. The method of claim 1 further comprising extracting a statistical feature from the primary audio signal; selecting a second set of reference samples from the reference database; and, computing a second emotional state score from a comparison of the statistical feature and the second set of reference samples; wherein determining further comprises determining a probable emotional state for the primary audio signal from the first and second emotional state scores.

3. A method for recognizing emotion in a primary audio signal comprising:
    extracting, using a computer, an MFCC feature from the primary audio signal;
    dividing, using a computer, the MFCC feature into MFCC subsections;
    selecting, using a computer, a set of the MFCC subsections;
    selecting, using a computer, a first set of reference samples from a reference database;
    computing, using a computer, a comparison of the set of MFCC subsections and the first set of reference samples; and
    determining, using a computer, a probable emotional state for the primary audio signal from the comparison.

4. The method of claim 3 wherein selecting further comprises selecting the set of reference samples from the reference database based on the MFCC feature.

5. The method of claim 3 wherein selecting further comprises selecting the set of reference samples from the reference database based on a statistical feature of the primary audio signal.

6. The method of claim 3 further comprising weighting the comparison based on distinguishability of the set of reference samples.

7. The method of claim 3 wherein dividing further comprises altering one of MFCC subsection length and overlap to optimize one of processing speed and emotion recognition accuracy.

8. The method of claim 3 further comprising filtering the primary audio signal using a dynamic filter.

9. The method of claim 8 further comprising adapting the dynamic filter to changes in the primary audio signal.

10. The method of claim 3 further comprising calculating a measure of certainty for the probable emotional state.

11. The method of claim 3 further comprising resampling the MFCC subsections based on the first set of reference samples.

12. The method of claim 3 further comprising resampling the MFCC subsections such that a counting of the MFCC subsections has the same result as a counting of subsections of a reference sample of the first set of reference samples.

13. The method of claim 3 further comprising training the reference database.

14. The method of claim 13 wherein training the reference database comprises training the reference database to optimize one of processing speed and emotion recognition accuracy.

* * * * *